United States Patent [19]
Kakutani et al.

[11] 3,741,857
[45] June 26, 1973

[54] COMPOSITE LIGHT WEIGHT BOARD AND MANUFACTURE THEREOF

[75] Inventors: Tsutomu Kakutani; Tetsuhiko Hirata; Shogo Matsuda, all of Tokyo; Kenji Inagaki, Yokohama; Hidetoshi Innami, Kawasaki, all of Japan

[73] Assignee: Asahi Kasei Kogyo Kabushiki Kaisha, Osaka, Japan

[22] Filed: Nov. 19, 1971

[21] Appl. No.: 200,437

[30] Foreign Application Priority Data
Nov. 20, 1970 Japan.............................. 45/102966

[52] U.S. Cl.................. 161/127, 156/205, 156/210, 156/244, 156/306, 156/500, 161/69, 161/122, 161/137, 161/139, 264/167, 264/177, 264/250
[51] Int. Cl....... B32b 1/00, B32b 3/00, B32b 31/00
[58] Field of Search .................... 161/41, 60, 68, 69, 161/122, 123, 127, 137, 139; 156/205, 210, 244, 306, 500; 264/167, 177, 250; 52/309

[56] References Cited
UNITED STATES PATENTS
| | | | |
|---|---|---|---|
| 3,388,522 | 6/1968 | Lowes.............................. | 161/127 X |
| 3,490,973 | 1/1970 | Graff et al. ......................... | 156/156 |
| 3,664,906 | 5/1972 | Hartig.................................. | 161/68 |

*Primary Examiner*—William A. Powell
*Attorney*—Richard C. Sughrue, Robert V. Sloan et al.

[57] ABSTRACT

A composite panel member of thermoplastic resin comprising three constituents fused together at their mutually contacting points, the two constituents of which consist of two comb-sectioned sheets coupled with each other in a substantially opposite and in a longitudinally offset way, the remaining constituent consisting of an intermediate sheet arranged between the two comb members and in a zigzag and saw tooth like manner between the said both.

3 Claims, 3 Drawing Figures

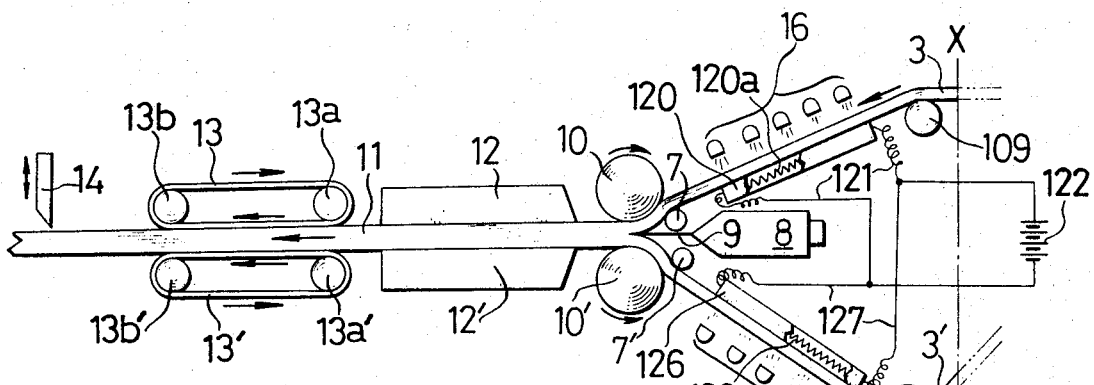
FIG. 1
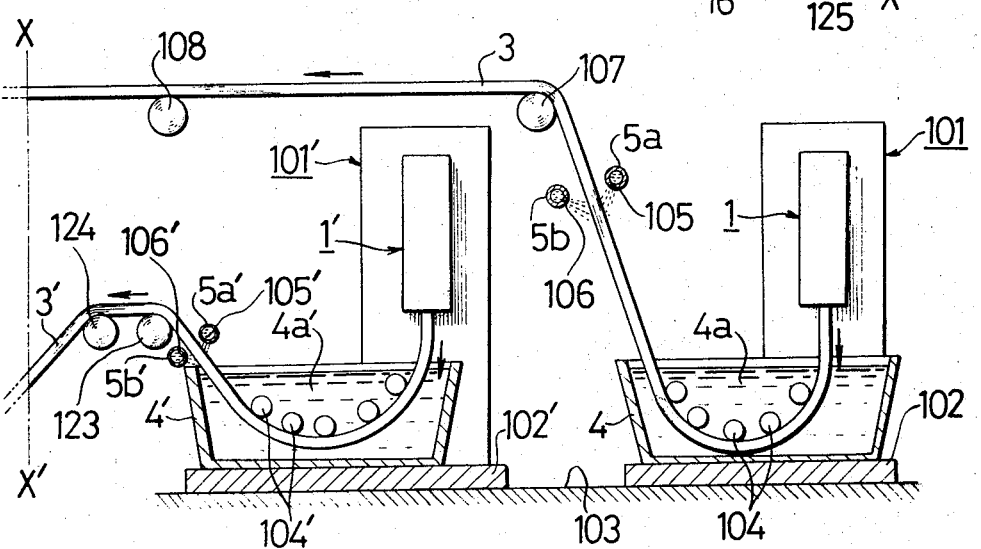
FIG. 2
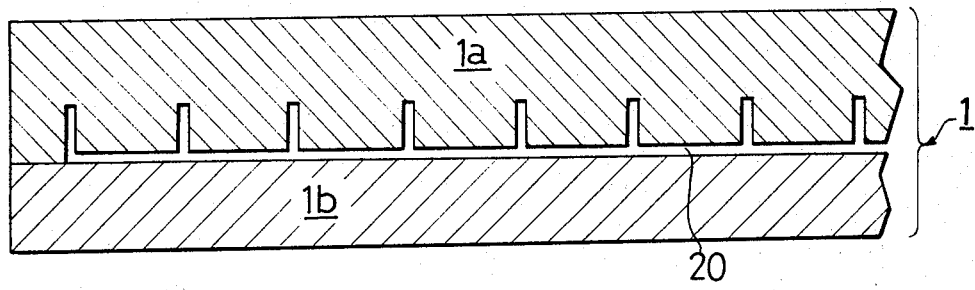
FIG. 3
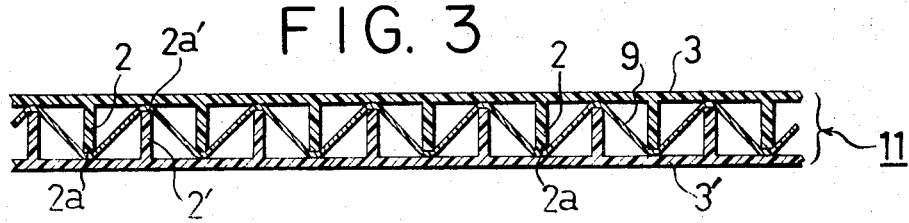

COMPOSITE LIGHT WEIGHT BOARD AND MANUFACTURE THEREOF

This invention relates to a composite hollow and light weight webs, made of same or different thermoplastic resins especially adapted for use as light weight constructional boards, corrugated plastic boards, wall and other rigid panels and the like.

The invention concerns with a process for the manufacture of same.

Hollow light weight panels made of thermoplastic resin are already known to those skilled in the art.

A representative prior method for the manufacture of such hollow structure boards as mentioned above reside in the extrusion thereof through an extrusion orifice having a corresponding orifice configuration.

A second prior art for the manufacture of such light panel is to extrude the plastic material from three neighboring extrusion orifices of which the middle one has shaped into a wavy orifice configuration and these three extruded components are united into one member by fusingly together while they are yet in their fluid conditions.

It is however an inherent drawback common to those prior known techniques that core part or parts of the composite board product has a relatively slow cooling before solidification and unification of the constituent parts, especially ribs thereof, which results in a highly slow manufacturing velocity and thus a disadvantageous inefficiency of the manufacturing process. Especially, in the case of the firstly mentioned prior process, the extrusion die is highly costly, in addition to the very difficulty in the design alteration of the final products. In the secondly mentioned prior method, the core or central member of the three constituents is in its substantially fluid state so that only a slight pressure can be applied when these constituents are united together by fusion state connection at their mutually contacting parts. Therefore, the fusionally solidified joints of the three constituent members represent naturally weaker points than other parts of the thus produced panel or board.

The main object of the invention is to provide a highly unique composite product of thermoplastic resin and an efficient process for the manufacture of same, substantially free of the aforementioned various conventional drawbacks.

These and other objects, features and advantages of the invention will become more apparent as the description proceeds by reference to the accompanying drawing illustrative a preferred embodiment of the new product and of a preferred embodiment of an apparatus adapted for performing the novel process for the manufacture of same.

In the drawing:

FIG. 1 represents a schematic elevational, partially sectional general arrangement of an apparatus which is adapted for carrying out the process according to this invention, the figure being drawn in two parts which are to be conjointed together over a partition line X—X'.

FIG. 2 is a part of an extrusion orifuce shown in its cross-section on an enlarged scale.

FIG. 3 is part of a cross-section of the novel composite, hollow and light weight panel manufactured according to the inventive process.

In the following, a preferred embodiment of the composite product and of a preferred process for the manufacture thereof will be described by reference to the accompanying drawing.

At first referring to FIG. 2, an extruding die unit 1 is partially shown in its section, a rough-pitched comb-shaped extrusion orifuce 20 being formed between die members 1a and 1b of the unit 1. The extrusion die unit 1 is a part of an extrusion machine 101 and rigid therewith; this machine is mounted on a base plate 102 which is mounted rigidly on the floor surface 103. Material feed hopper, feed pump, material heater, preferably of electrical type, pump drive means with drive motor, and the like conventional parts of the extruder machine are omitted from the drawing on account of very popularity thereof.

Separated a certain slight horizontal distance from the first die unit 1 and first extruder machine 101, there are provided a second die unit 1' and a second extruder machine 101', these being of the similar design and arrangement with the first unit and rigidly mounted on a second base plate 102'.

From these die units 1 and 1', two sheets of a thermoplastic material such as polyester, polypropylene or the like and of a correspondingly comb-shaped cross-sectional configuration are continuously extruded in the corresponding cooling water baths 4a and 4a' contained in container vessels 4 and 4', respectively, which are fitted with conventional cooling medium recirculating means, although not shown for simplicity. In FIG. 1, the extruded comb-shaped plastic sheets 3 and 3' are shown only in plain sheets for simplicity of the drawing. As shown, the container vessels 4 and 4' are rigidly mounted on respective base plates 102 and 102'.

A plurality of guide rollers 104 are rotatably mounted on the inside walls of the container vessel 4 and in the bath 4a, so as to provide in combination a curved passage for the extruded and immersed comb sheet 3.

In the second vessel 4', a similar group of guide rollers 104' are provided for the comb sheet 3'.

By the provision of these guide rollers 104;104' and cooling water baths 4a;4a', the sheets 3 and 3' have a substantially lower temperature than the melting point of the resin, when they emerge from the free surface of the respective baths.

Upon emerged from cooling bath 4a, the sheet 3 passes between a pair of air knives 5a and 5b which consist of perforated pipes and laterally extending relative to the sheet and rigidly mounted in position and supplied with compressed air from a certain supply source, although the latter and the supprting means have been omitted from the drawing for simplicity thereof. A plurality of orifice openings 105 and 106 of these pipes 5a and 5b, air jets impinge upon the both surfaces of sheet 3 so as to remove entrained water droplets by the latter. As seen, a pair of similar air knives 5a' and 5b' having orifice openings 105' and 106', respectively, are provided for the second sheet 3' in the similar way.

After passage of the sheet 3 through a plurality of guide rollers 107, 108 and 109, the sheet 3 is brought into sliding contact with a stationary heating plate 120 which has an electric heating element 120a connected electrically through lead means 121 to a current source 122. By this contact of the sheet 3 with heating plate 120, the former is reheated at the respective tip ends 2a of the comb teeth 2 of sheet 3 to a certain temperature below and in proximity to the melting point of the resin material of sheet 3.

In the corresponding way, second sheet 3' is fed through properly mounted rotatable rollers 123-125 and then brought into sliding contact with a heating plate 126 provided with a resistance heating element 126a which is connected through lead means 127 with the current source 122.

In this way, the respective tip ends 2a' of comb teeth 2' of the second sheet 3' are equally reheated.

After respective passage of the sheets 3 and 3' through guide rollers 7 and 7' in such mutual zigzag phase as shown more specifically in FIG. 3 that the comb teeth 2 and 2' of both sheets 3 and 3' are arranged in an alternative way when seen in the travelling direction thereof, and upon introducing an intermediate sheet 9 of the similar thermoplastic resin as that of the sheets 3 and 3' between the both sheets, and more specifically in such manner that it threads alternatively the teeth extremities so as to form a saw tooth-like travel passage as shown more specifically again in FIG. 3, the composite web consisting of the aforementioned three component sheets 3, 3' and 9 is passed through and between a pair of positively driven feed rollers 10 and 10' of which the necessary drive means therefor have been omitted from the drawing on account of their very popularity and for simplicity of the drawing.

It should be noted that the intermediate sheet 9 having a plain plate-like cross-sectional configuration as may be well supposed again from FIG. 3 is extruded from a conventional sheet extruder unit only schematically shown at 8 in FIG. 1.

During passage through roller pair 10;10', the composite sheet 11 is subjected to a slight pressures acting from upper and from below, the rib or tooth end extrimities 2a;2a', reheated during the preceeding heating step, they are so-to-speak welded together with the intermediate sheet 9. Thus, all the three sheets 3, 3' and 9 are united rigidly with each other, so as to a rigid, yet hollow composite and light weight web 11 which is then passed through and between a pair of sizing plates 12;12' having perforated surfaces to contact with the upper and lower surfaces of the composite web 11, so as to anneal the latter by providing a certain amount of heat thereto, preferably in the form of steam. For this purpose, the plates 12;12' are shaped into hollow members and connected preferably with a steam generator, a hot air supply source. Or alternatively, these plates 12;12' may be equipped with electrically heatable resistance elements connected with a suitable current source, as in the similar way to the case of heating plates 120 and 126, although not specifically shown.

Upon appearing from the outlet sides of sizing plates 12;12', the composite web 11 is caught by and between a pair of cooperating endless feed belts 13;13' positively driven by respective roller pairs 13a;13b and 13a';13b'. At the reception zone, there is provided a cutter 14 which is adapted for making a cutting job, so as to cut the transferred web 11 into prescribed lengths, although the drive means of the cutter have been omitted from the drawing on account of its very popularity.

The composite hollow web 11 has thus two main comb-shaped components 3 and 3' which have been quenched by water directly after being extruded and thus provide an efficient smoothness on their exposed surfaces. As determined by practical experiments, the composite web 11 has a substantial rigidity, although it has a large hollowness. The formation of the comb-shaped components 3;3' can be performed at a rather high manufacturing speed especially by virtue of the said water cooling directly after their extrusion from their respective extruder heads 1 and 1'. As an example, even when either of the comb components 3;3', having an even wall thickness of 0.3 mm, and made of high density polyethylene can be manufactured continuously at a travel speed of 30 m/min. or higher, their ribs or tooth projections 2;2' may not be subjected to unacceptable deformation and represent a superior degree of rigid plane nature and overall smoothness. The welding or fusing together of the three components into a rigid hollow composite web 11 could be performed at the above specified or more high operational speed.

When it is necessary to manufacture the composite web 11 at a still higher manufacturing speed, the reheating step by contact of heating plates 6;6' can be replaced by remotely arranged heating means such as conventional infrared heater means, as shown schematically at 16;16' in FIG. 1. If the thermal capacity of the intermediate sheet 9 is ample, the reheating of rib ends 2a;2a' may be dispensed with. It should be however noted that the reheating of the rib ends by contact with heating plates 6;6' not only assists and accelerates the welding or co-fusing effect among the three components 3, 3' and 9, but also contributes to a proper heating of the outer or comb components 3;3', especially the ribs 2;2', so as to provide an efficient annealing effect of these components 3;3'. In this way, otherwise appearing thermal deformation of these components can be substantially relieved. Especially, when the material of these combs is a crystalline resin such as polyethylene, polypropylene or the like, the crystallines degree and the rigidity of the material resin would become deteriorated during the aforementioned water cooling effect directly upon extrusion, the reheating stages at 6 and 6' will provide the resin with a kind of annealing effect which will recover the once worsed rigidity or crystalline degree. Therefore, the reheating step by means of heating means 6;6' or 16;16' is highly recommendable.

Under occasion, the rolls 10;10' may be of heatable type for the above purpose.

If necessary, heating means may be arranged at the intermediate zone defined between the roller pair 10;10' and sizing plates 12;12', so as to increase the desired annealing effect.

If there be thinner wall part or parts exist in the comb 3 or 3', they represent naturally a higher cooling velocity than other remaining parts of the comb and may represent a corresponding slackend parts upon cooled, on account of smaller degree of contraction in comparison with other parts. Therefore, it is highly recommendable to design the extrusion orifice to have an even width over the whole parts thereof, for extruding a comb having a substantially eqaul wall thickness.

The most salient feature of the present invention resides in an amazingly high speed formation of the composite, hollow and light weight web, having a superior plane characteristic, a strong fusion connections overall the jointed regiong and an attractively beautiful appearance. A multicolor effect can be provided by employing differently colored materials for the three components. When necessary, these three components may have different wall thickness from each other, although not specifically shown and described in the foregoing.

Under occasions, one or more constituents of the composite web may be prepared from a foamed plastic material.

It will be well acknowledged from the foregoing that the invention means a remarkable progress in the art.

The embodiments of the invention in which an exclusive property or privilege is claimed are as follows:

1. A composite, hollow and light weight web, comprising a first elongated comb member made of a thermoplastic material and having its comb teeth extending in parallel with each other and in the longitudinal direction of said comb member, a second elongated comb member made of a thermoplastic material and having its comb teeth extending in parallel with each other and in the longitudinal direction of said first comb member, and an intermediate sheet member, said both comb members being arranged in a longitudinally offset way to each other in such manner that the comb projections of said first comb member are arranged alternately with those of the second comb member and said intermediate sheet being threaded in a saw tooth shape and over the all the tip ends of said comb projections, said first and second comb members and said intermediate sheet being rigidly fused together at their mutually contacting points, so as to provide a united rigid structure.

2. A process fo the manufacture of a composite, hollow and light weight web, comprising the steps of:
    1. extruding two elongated comb sheets of thermoplastic material from two different extrusion orifuces;
    2. quenching these comb sheets directly upon extruded;
    3. extruding an intermediate sheet of thermoplastic material from a separate orifice opening;
    4. arranging the comb sheets in a longitudinally offset way to each other so as to arrange the comb teeth of the first comb sheet to occupy alternate positions relative to the comb teeth of the second comb sheet;
    5. uniting the first and second comb sheets with said intermediate sheet into a rigid composite hollow web by fusing together at their contacting points among these three constituting components, said intermediate sheet being arranged so as to describe a saw tooth configuration between the first and second comb sheets.

3. A process as claimed in claim 2, further comprising a reheating step for the quenched comb sheets and before preforming thereof with the intermediate sheet.

* * * * *